US010177406B2

(12) United States Patent
Miara et al.

(10) Patent No.: US 10,177,406 B2
(45) Date of Patent: Jan. 8, 2019

(54) SOLID ELECTROLYTE AND/OR ELECTROACTIVE MATERIAL

(71) Applicants: Samsung Electronics Co., Ltd., Suwon-si, Gyeonggi-do (KR); Massachusetts Institute of Technology, Cambridge, MA (US)

(72) Inventors: Lincoln J. Miara, Cambridge, MA (US); William D. Richards, Cambridge, MA (US); Yan E. Wang, Cambridge, MA (US); Jae Chul Kim, Emeryville, CA (US); Gerbrand Ceder, Orinda, CA (US)

(73) Assignees: SAMSUNG ELECTRONICS CO., LTD., Gyeonggi-Do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/155,354

(22) Filed: May 16, 2016

(65) Prior Publication Data
US 2017/0025705 A1    Jan. 26, 2017

Related U.S. Application Data

(60) Provisional application No. 62/195,220, filed on Jul. 21, 2015.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0071* (2013.01)

(58) Field of Classification Search
None
See application file for complete search history.

(56) References Cited

U.S. PATENT DOCUMENTS 9,067,790 B2   6/2015   Hayden et al.
2013/0137009 A1   5/2013   Jin et al.
(Continued)

FOREIGN PATENT DOCUMENTS

EP    2874208 A1    5/2015
WO    2012112229 A2    8/2012
(Continued)

OTHER PUBLICATIONS

"Pathion Announces Breakthroughs in Safe High-Energy Lithium Ion Batteries," Pathion News Center, http://www.prweb.com/releases/2015/04/prweb12684913.htm, Dec. 21, 2015, 4 pages.
(Continued)

*Primary Examiner* — Lucas J. O'Donnell
(74) *Attorney, Agent, or Firm* — Cantor Colburn LLP

(57) ABSTRACT

Solid electrolyte materials as well as their applications and methods of manufacture are disclosed. In one embodiment, a solid electrolyte material has a formula of $A_{3+\delta}Cl_{1-\delta}B_\delta O$, where $\delta$ is greater than 0. In the above formula, A is at least one of Li and Na, and B is at least one of S, Se, and N. In another embodiment, a solid electrolyte material is a crystal structure having the general formula $A_3XO$, where A is at least one of Li and Na. Additionally, X is Cl, at least a portion of which is substituted with at least one of S, Se, and N. The solid electrolyte material also includes interstitial lithium ions and/or interstitial sodium ions located in the crystal structure.

20 Claims, 8 Drawing Sheets

(56) References Cited

U.S. PATENT DOCUMENTS

| | | |
|---|---|---|
| 2014/0050982 A1 | 2/2014 | Lu et al. |
| 2014/0113187 A1 | 4/2014 | Winoto et al. |
| 2015/0004475 A1 | 1/2015 | Jeon et al. |
| 2015/0079471 A1 | 3/2015 | Fang et al. |
| 2015/0171430 A1 | 6/2015 | Engel et al. |
| 2015/0270571 A1 | 9/2015 | Kambara et al. |
| 2015/0364788 A1 | 12/2015 | Lu et al. |

FOREIGN PATENT DOCUMENTS

| | | |
|---|---|---|
| WO | 2013164116 A1 | 11/2013 |
| WO | 2014150763 A1 | 9/2014 |
| WO | 2014176266 A1 | 10/2014 |
| WO | 2015128834 A1 | 9/2015 |

OTHER PUBLICATIONS

Bilal, et al., "Electronic Properties of Antiperovskite Materials from State-of-the-Art Density Functional Theory," Journal of Chemistry, vol. 2015, Article ID 495131, 11 pages.

Braga, et al., "Novel Li3Clo based glasses with superionic properties for lithium batteries," Journal of Materials Chemistry A, Apr. 2014, 2, 5470-5480.

Emly, et al., "Phase Stability and Transport Mechanisms in Antiperovskite Li3OCl and Li3OBr Superionic Conductors," Chemistry of Materials 2013, 25, published Nov. 26, 2013, pp. 4663-4670.

Holzwarth, "Solid electrolytes for battery applications—a theoretical perspective," Wake Forest University, Apr. 6, 2012, Seminar: University of Louisville, 31 pages.

Kamaya, et al., "A lithium superionic conductor," Nature Materials, vol. 10, Sep. 2011, pp. 682-686.

Kresse, et al., "Efficient iterative schemes for ab initio total-energy calculations using a plane-wave basis set," Physical Review B, vol. 54, No. 16, Oct. 15, 1996, pp. 169-186.

Kresse, et al., "From ultrasoft pseudopotentials to the projector augmented-wave method," Physical Review B, vol. 59, No. 3, Jan. 15, 1999, pp. 1758-1775.

Lu, et al., "Li-rich anti-perovskite Li3OCl films with enhanced ionic conductivity," Chem. Commun., 2014, 50, pp. 11520-11522.

Tarascon, et al., "Issues and challenges facing rechargeable lithium batteries," Nature, vol. 414, Nov. 15, 2001, pp. 359-367.

Wang, et al., "Design principles for solid-state lithium superionic conductors," nature materials, www.nature.com/nature materials, supplementary information, Aug. 17, 2015, 19 pages.

Wang, et al., "Solid Electrolytes for Next Generation Batteries," DOE Vehicle Technologies Annual Merit Review Meeting, May 14-18, 2012, 18 pages.

Wong, et al., "Nonflammable perfluoropolyether-based electrolytes for lithium batteries", PNAS, vol. 111, No. 9, Mar. 4, 2014, pp. 3327-3331.

Zhao, et al., "Superionic Conductivity in Lithium-Rich Anti-Perovskites," Journal of the American Chemical Society, 2012, 134, published Jul. 30, 2012, pp. 15042-15047.

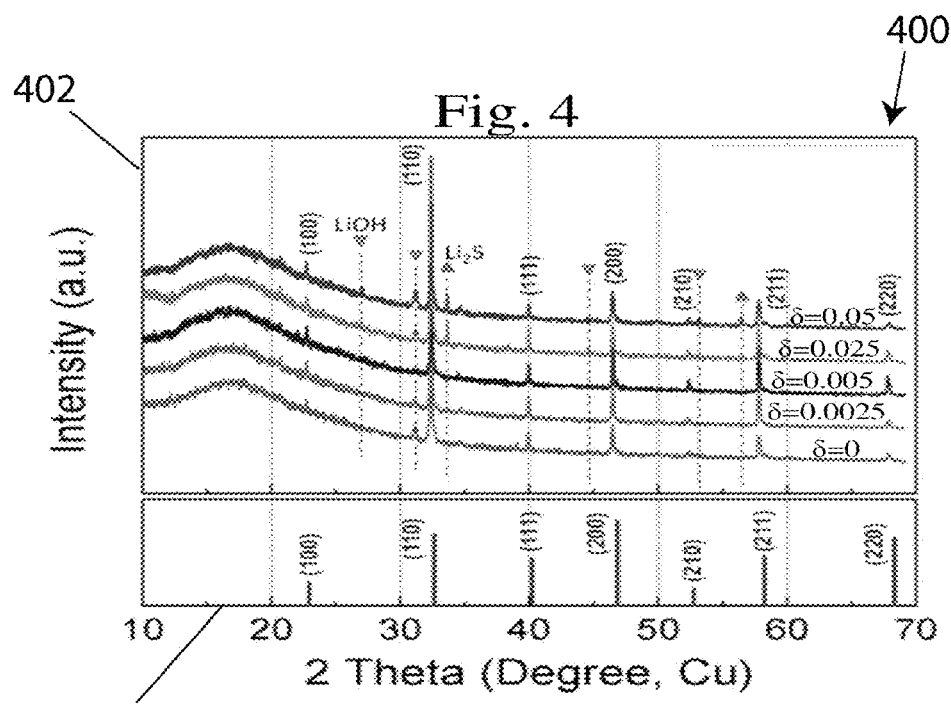
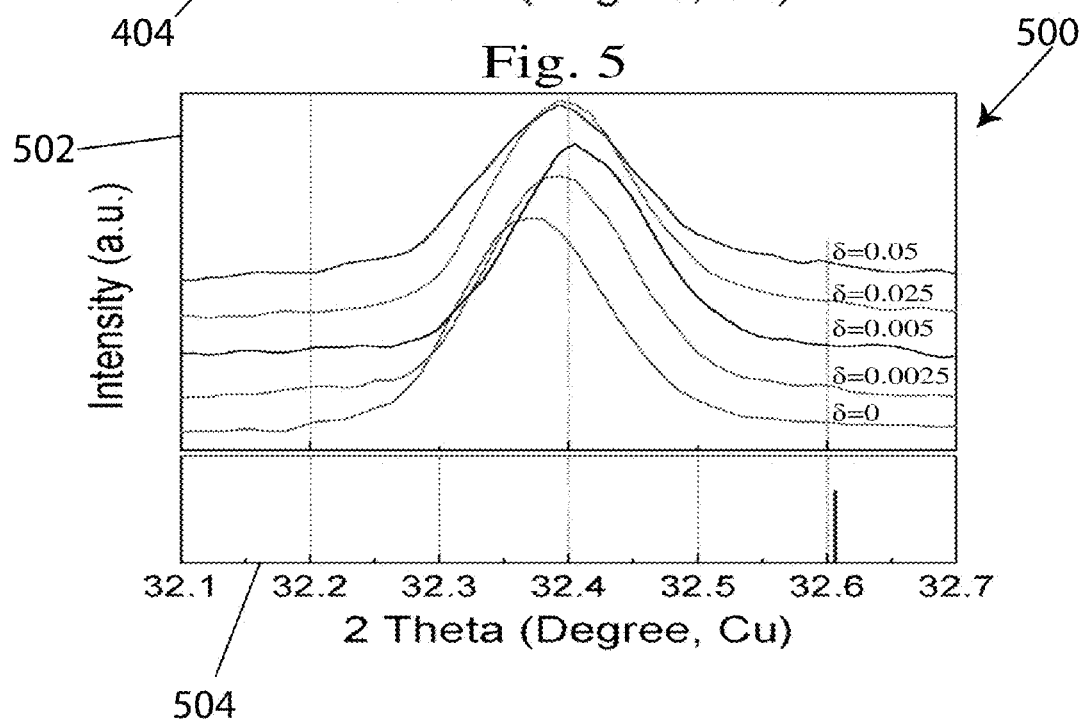

After annealing at 200°C

US 10,177,406 B2

SOLID ELECTROLYTE AND/OR ELECTROACTIVE MATERIAL

RELATED APPLICATIONS

This application claims the benefit, under 35 U.S.C. § 119(e), of U.S. Provisional Patent Application Ser. No. 62/195,220 to Gerbrand et al., entitled "Solid Electrolyte," filed on Jul. 21, 2015.

BACKGROUND

Currently, typical Li-ion batteries use a carbonate-based liquid with high lithium-ion conductivity as the electrolyte. However, these liquid electrolytes are flammable and are unstable in highly oxidizing environments. Consequently, there has been a focus on developing new solid electrolytes to enable safer operation of electrochemical energy storage devices such as Li-ion batteries.

For example, a sulfide based material, $Li_{10}GeP_2S_{12}$, has shown a promising ionic conductivity of about 10 mS cm$^{-1}$ at room temperature. However, it contains Ge, a high cost raw material, which hinders its large-scale implementation in Li-ion batteries, for which solid electrolytes are most applicable. Additionally, an antiperovskite $Li_3ClO$, and its Ba-doped derivative, were recently reported as potential solid electrolyte materials showing comparable ionic conductivity to $Li_{10}GeP_2S_{12}$ at room temperature.

SUMMARY

In a first embodiment, a solid electrolyte material has a formula of $A_{3+\delta}Cl_{1-\delta}B_\delta O$, where $\delta$ is greater than 0. Further, A is at least one of Li and Na, and B is at least one of S, Se, and N.

In another embodiment, a solid electrolyte material is a crystal structure having the general formula $A_3XO$, where A is at least one of Li and Na. Additionally, X is Cl, at least a portion of which is substituted with at least one of S, Se, and N. Interstitial lithium ions and/or interstitial sodium ions are also located in the crystal structure.

In yet another embodiment, an electrochemical device has a first electrode, a second electrode, and a solid electrolyte material including $A_{3+\delta}Cl_{1-\delta}B_\delta O$ disposed between the first and second electrodes. In the above formula, $\delta$ is greater than 0, A is at least one of Li and Na, and B is at least one of S, Se, and N.

In yet another embodiment, an electrochemical device has a first electrode, a second electrode, and a solid electrolyte material disposed between the first and second electrodes. The solid electrolyte material has a crystal structure having the general formula $A_3XO$, where A is at least one of Li and Na. Additionally, X is Cl, at least a portion of which may be substituted with at least one of S, Se, and N. Interstitial lithium ions and/or interstitial sodium ions are also located in the crystal structure.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 4 is a graph of x-ray diffraction (XRD) patterns of $Li_{3+\delta}Cl_{1-\delta}S_\delta O$ for different values of $\delta$ between 0 and 0.05;

FIG. 5 is a graph of magnified XRD patterns of $Li_{3+\delta}Cl_{1-\delta}S_\delta O$ for different values of $\delta$ between 0 and 0.05 around the (110) peak;

DETAILED DESCRIPTION

Figure 1:
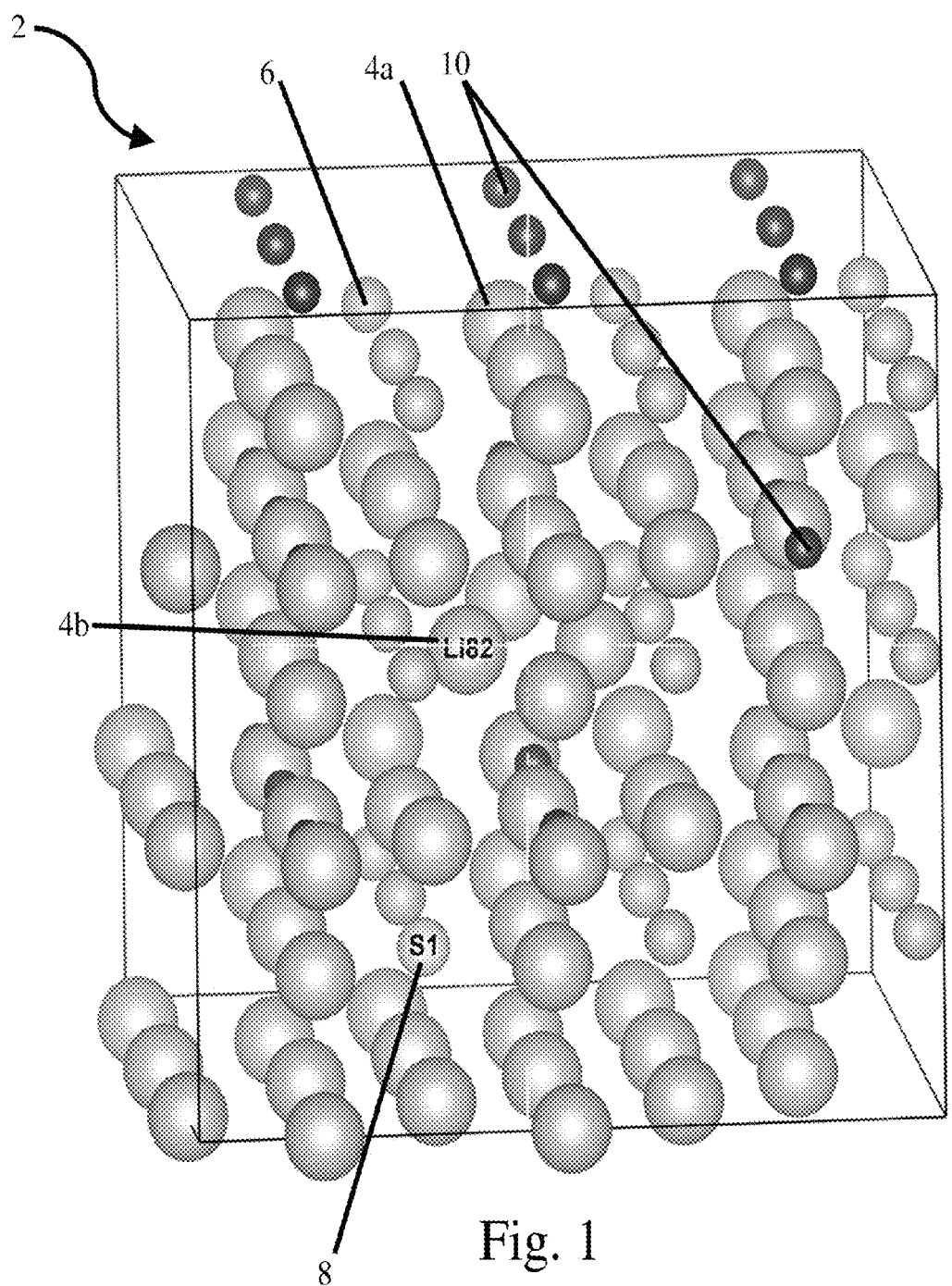
FIG. 1 is a schematic diagram of a $(Li_{81}Li^+)(Cl_{26}S^{2-})O_{27}$ super cell.

Previous studies of $Li_3ClO$ have focused on inducing lithium vacancies to create lithium ion conduction in the solid electrolyte. However, the inventors have recognized that the use of vacancies as charge carriers in $Li_3ClO$ is unfavorable due to the relatively high defect formation energy. Without wishing to be bound by theory, this high defect formation energy makes it difficult to control the amount of charge carriers present in such a material which may result in inconsistent material properties in addition to possibly lower charge carrier diffusion rates. Consequently, the inventors have recognized the benefits associated with doping a $Li_3ClO$ and/or $Na_3ClO$ material, and other related materials, to form interstitial lithium and/or interstitial sodium that acts as a charge carrier in the solid electrolyte.

In view of the above, in one embodiment, a solid electrolyte material has a crystal structure with a general formula of $A_3XO$ where A at least one, or both, of lithium (Li) and sodium (Na). Further, X is chlorine (Cl) with at least a portion of the Cl substituted with at least one of sulfur (S), selenium (Se), and nitrogen (N). The solid electrolyte material also includes additional lithium and/or sodium ions located at the interstitial positions within the crystal structure.

In one specific embodiment, a solid electrolyte material has the formula $A_{3+\delta}Cl_{1-\delta}B_\delta O$. Similar to the above, A may correspond to either one or both of Li and/or Na. Similarly, B is at least one of S, Se, and N. The variable $\delta$ varies the relative concentrations of interstitial lithium and/or sodium ions as well as the relative concentrations of chlorine and the elements substituted for chlorine. As detailed in the examples below, the solid electrolyte forms additional phases for values greater than 0.05. Consequently, depending on the embodiment, δ may be greater than 0 and less than or equal to 0.05. However, values of δ both in between these numbers and greater than 0.05 are also contemplated. For example, δ may be greater than or equal to 0.001, 0.01, 0.025, or any other appropriate value. Correspondingly, δ may be less than or equal to 0.05, 0.04, 0.025, or any other appropriate value. Combinations of the above ranges of δ are contemplated including, for example, δ may be between or equal to 0.001 and 0.05, 0.001 and 0.05, 0.005 and 0.025, or any other appropriate range.

In view of the above values for δ, a solid electrolyte, including a substituted crystal structure with the general formula of $A_3XO$, may have a corresponding range of interstitial lithium and/or sodium. Concentration of the interstitial species in the crystal structure may be greater than or equal to 0.02 atomic percent, 0.2 atomic percent, 0.5 atomic percent, or any other appropriate concentration. Correspondingly, a concentration of the interstitial species may be less than or equal to 1 atomic percent, 0.5 atomic percent, 0.2 atomic percent, or any other appropriate concentration. Combinations of the above ranges for the concentration of an interstitial species are contemplated including, for example, a concentration between about 0.02 atomic percent and 1 atomic percent.

In some embodiments the described solid electrolyte compounds are crystalline solids. For example, the cations and anions disclosed herein forming the compound may be arranged in a repeating array having a definite crystal structure, i.e., defining a unit cell atomic arrangement that is repeated to form the overall crystal structure. In some embodiments, at least a portion of the compound is present in a crystal structure that is an antiperovskite crystal structure. FIG. 1 depicts one example of a super cell including $(Li_{81}Li^+)(Cl_{26}S^{2-})O_{27}$ having a substituted antiperovskite crystal structure 2 that is used in the computational methods detailed below. In the figure, lithium bound in the crystal structure is represented by atoms 4a. Interstitial lithium ion is depicted by atom 4b. Cl is represented by atoms 6 and the substituted sulfur shown by atoms 8. The oxygen is depicted as atoms 10. There are many different measurement techniques that may be used to determine if a compound has an antiperovskite crystal structure including, but not limited to, x-ray diffraction (XRD) and transmission electron microscopy (TEM).

It should be understood that other crystal structures may also be present in a solid electrolyte compound as the current disclosure is not limited to any particular purity and it is contemplated that the solid electrolyte materials might be intermixed with an electroactive material to form a composite structure. In either case, depending on the embodiment, at least about 99% (by weight) of a material including the disclosed compounds may exhibit the disclosed compositions and crystal structures, while the other 1% of the compound may exhibit other crystal structures and/or compounds such as, for example, an amorphous phase or a secondary phase such as $Li_2S$, LiCl, $Li_5Cl_3O$, and $Li_5Cl_3(OH)_2$, a separate electroactive material, or any other appropriate compound. In other embodiments, at least about 95%, 90%, 80%, 70%, 60%, 50%, 40%, 30%, or 20% of a material may exhibit the described crystal structures and compositions described herein. The presence and relative percentages of the crystal structures in a solid electrolyte may again be determined using any suitable technique known to those of ordinary skill in the art including, for example, XRD and TEM measurements.

In some cases, other elements may be present within the disclosed compounds either as impurities and/or additional substituents. However, these impurities and/or additional substituents may not, in some embodiments, substantially alter the crystal structure of the compound and its interstitially located charge carriers. Alternatively, these impurities and/or additional substituents may simply form an inert material, or a material that does not materially affect the overall performance of the surrounding solid electrolyte. In either case, it should be understood that the presence of such impurities and/or additional substituents are contemplated and should be considered part of the current disclosure.

In some embodiments, the currently disclosed solid electrolytes exhibit conductivities at room temperature that are less than or equal to $10^{-1}$ mS cm$^{-1}$, $5 \times 10^{-2}$ mS cm$^{-1}$, $10^{-2}$ mS cm$^{-1}$, or any other appropriate conductivity. Depending on the particular material, the conductivity at room temperature of the solid electrolyte may also be greater than or equal to $10^{-3}$ mS cm$^{-1}$, $5 \times 10^{-3}$ mS cm$^{-1}$, $10^{-2}$ mS cm$^{-1}$, $5 \times 10^{-2}$ mS cm$^{-1}$, or any other appropriate conductivity. For example, a conductivity of the solid electrolyte may be between or equal to $10^{-3}$ mS cm$^{-1}$ and $10^{-1}$ mS cm$^{-1}$. The conductivity of the material may be confirmed using any number of different methods including impedance spectroscopy measurements. While particular conductivities are discussed above, it should be understood that solid electrolytes with conductivities both larger and smaller than those noted above are possible.

The melting temperature of $Li_3ClO$ is 282° C. Therefore, the melting temperature of the currently described solid electrolytes is expected to be similar to the melting temperature of the unsubstituted $Li_3ClO$. For example, the melting temperature may be between or equal to about 280° C. and 295° C. However, solid electrolytes having melting temperatures both greater or less than those noted above are also possible.

Having generally described the solid electrolytes and their properties, one possible method for synthesizing these materials is described below. However, it is expected that these materials may be formed in any number of ways as the current disclosure is not limited to any one formation method for these compounds.

In one embodiment, a solid electrolyte compound may be prepared by combining one or more suitable precursors together, melting the precursors to form a uniform molten solution, removing unwanted reaction products from the solution, quenching the molten solution, and subsequent solid electrolyte formation steps. These general steps are expanded on below.

Non-limiting examples of possible precursors are provided below. However, it should be understood that any number of different precursors and reactions may be used to arrive at the current solid electrolyte compositions as these compounds are not limited to any particular method of use. Possible precursors for Na and Li include metallic Na and Li as well as the other precursors including these elements. Precursors for Se, S, and N may include selenides (e.g., $Na_2Se$ and $Li_2Se$), sulfides (e.g., $Na_2S$ and $Li_2S$), and/or nitrides (e.g., $Na_3N$ and $Li_3N$). Cl may be provided by a suitable salt precursor such as LiCl and NaCl. Possible precursors for O include hydroxides (e.g., NaOH and LiOH) and oxides (e.g., $Na_2O$ and $Li_2O$). As noted above regarding Li and Na precursors, in some cases, a precursor may be a precursor of more than one of Li, Na, S, Se, N, and O, etc. (e.g., $Li_2S$ is a precursor for both Li and S). Depending on the particular formation process, the precursors may also be mixed prior to melting, for example, by grinding, milling (e.g., ball milling), or the like.

After combining the precursors, the precursors are placed into a suitable container and subjected to either vacuum or a suitable flush with an inert atmosphere. The precursors are then heated to a temperature, at or above, the final solid electrolyte's melting temperature. In some embodiments, the temperature may still be below the melting temperature of one or more of the precursors. In such an embodiment, the temperature may be held at a suitable elevated temperature for a sufficient duration of time to ensure that the solid precursors fully dissolve into, and are uniformly mixed with, the molten solution either through a solid state reaction or through a solid liquid reaction. While an elevated temperature is desirable to quickly combine the precursors, in some embodiments, it may be desirable to limit the processing temperature and/or time to avoid excessive loss of one or more lighter elements such as Li. For example, a temperature of the precursors may be maintained between or equal to 300° C. and 400° C., 350° C. and 400° C., or any other appropriate range of temperatures. Additionally, depending on the particular temperature used, the precursors may be held at temperature for between or equal to 2 hours and 12 hours, 12 hours and 24 hours, or any other appropriate time period including time periods both longer and shorter than those noted above.

In instances where a hydroxide, or possibly a hydrate, is used as one of the precursors, it may be desirable to remove any resulting water from the container. This may be accomplished in any number of ways. For example, a liquid nitrogen cold trap can be attached to an evacuation line in order to remove water vapor formed during processing. Alternatively, appropriate fluxes and/or scavenging compounds might be used as the disclosure is not limited to any particular method of removing water from the resulting compound. Similarly, fluxes and/or scavenging compounds might also be used to aid in removing other impurities from the resulting compound as well.

After the precursors have melted and formed a uniform molten solution, the molten solution is quenched to room temperature. This may be done at any appropriate cooling rate. However, cooling rates of about 200° C. s⁻ have been experimental observed to form an antiperovskite crystal structure. Of course cooling rates both slower and faster than this cooling rate may be used. Further, sufficiently fast cooling rates may result in either a partially or fully amorphous compound which may be desirable in some applications.

After formation, the resulting solid electrolyte compound may be ground or milled to form particles using, for example, ball milling or grinding. In one embodiment, the solid electrolyte particles may then be mixed with an active electrochemical material, formed into a green part either separately, or while disposed on an electrode, and subjected to a sintering process to form a final electrode assembly. Alternatively, the solid electrolyte particles may be formed into a green part without another electroactive material present to form a solid electrolyte component that may be assembled between the electrodes of an electrochemical device. If necessary, an appropriate binder may be used when forming the green parts prior to sintering. Sintering of the material to form a densified part may be conducted at any appropriate temperature below the melting temperature of the solid electrolyte. However, in one embodiment a solid electrolyte compound as described herein may be fired at temperatures between or equal to about 250° C. and 300° C., 250° C. and 285° C., or any other appropriate range of temperatures.

While particle formation and sintering processes have been described above, the current disclosure is not limited to sintering of solid electrolyte particles for forming a final solid electrolyte for use in an electrochemical device. For example, depending on the processing temperatures of the components involved, it may be desirable to quench the molten solution in a mold, or in place within an electrochemical device, to form the final solid electrolyte without the need for forming a powder and sintering it to provide a final part.

In some embodiments, a solid electrolyte compound as discussed herein may be used in any number of electrochemical devices. These include, but are not limited to use in both primary and secondary batteries, capacitors, super capacitors, a protective coating layer for electrode materials, and any other appropriate application as the disclosure is not so limited. Further, these solid electrolytes may be of particular use in Li-ion and Na-ion based electrochemical devices. In some embodiments, the solid electrolyte is assembled in an electrochemical device including at least first and second opposing electrodes including a current collector and an electroactive material disposed on the current collector. In such an embodiment, the solid electrolyte compound may be disposed between the two electrode structures. Additionally, in instances where an electrolyte is needed within the electrodes themselves, the solid electrolyte may be intermixed with the electroactive material of the electrodes to provide for ion transport there as well. In some embodiments, the first and second electrodes are an opposing anode and cathode.

Examples: Overview

The formation energies of a Li+ interstitial in a $S^{2-}$ substituted $(Li_{81}Li^+)(Cl_{26}S^{2-})O_{27}$ super cell, as shown in FIG. 1 and described above, was calculated and used to predict the Li diffusivity and migration barrier. As detailed further below, computational studies predict that the Li interstitial is the more favorable charge carrier with a low migration barrier as compared to the Li vacancies created in prior studies which exhibit a higher migration barrier. The compounds were then synthesized to evaluate the preliminary electrochemical behavior of these materials by impedance spectroscopy. Specifically, compounds of $Li_{3+\delta}Cl_{1-\delta}S_\delta O$, where $\delta$ is between or equal to 0 and 0.05, were synthesized using a simple solid-state method. Impedance spectroscopy results show that S substitution did improve the superionic conductivity in Li3ClO as predicted by the computational studies. Given that the tested pellets were not completely optimized, it is expected that these materials will exhibit even better final properties than these promising preliminary results.

Examples: Computational Methodology

Figure 2:
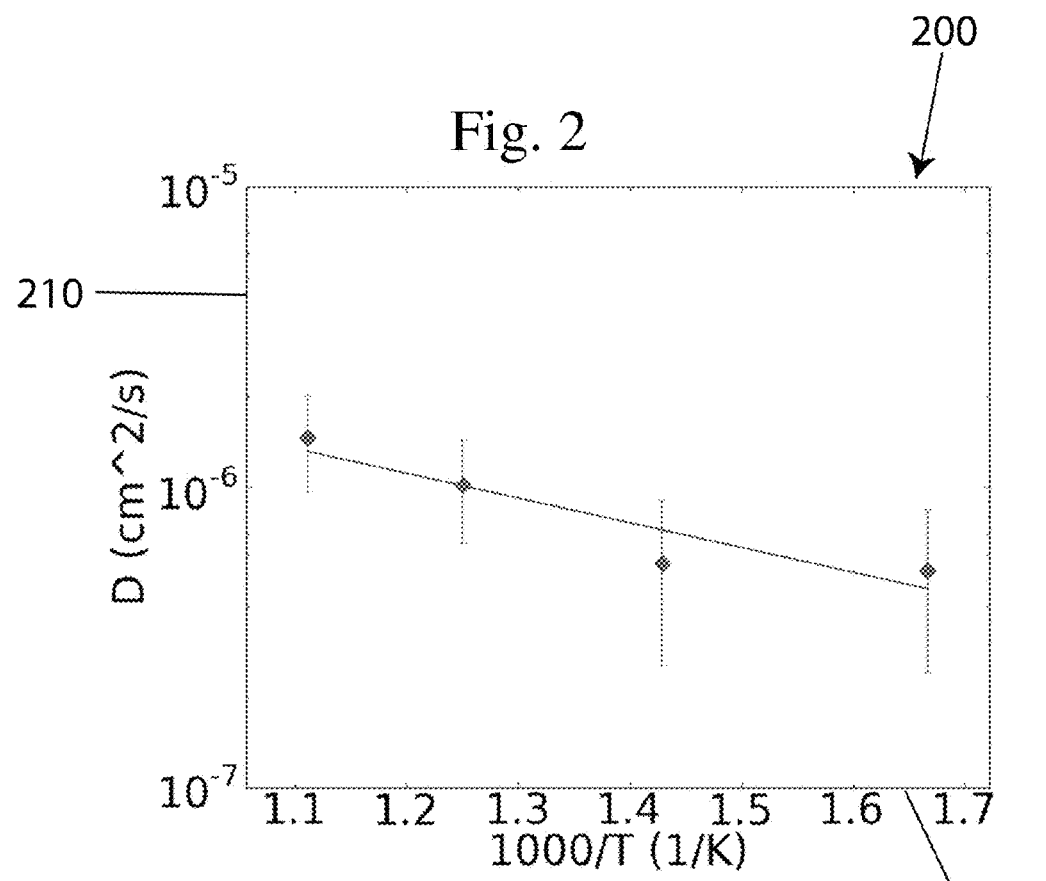
FIG. 2 is a graph of calculated Li diffusivities of $(Li_{81}Li^+)(Cl_{26}S^{2-})O_{27}$ obtained from ab initio molecular dynamics simulations with simulation length over 100 picoseconds.

The formation of the Li interstitial by S substitution for Cl was investigated by first-principles calculation using density functional theory with the generalized gradient approximation. The Li⁺ migration barriers were obtained by molecular dynamics simulations. Using the crystal structure shown in FIG. 1, the formation energy of a Li⁺ interstitial by $S^{2-}$ doping is approximately 1.2 eV per defect, which is much less than that for forming a Li⁺ vacancy by $Ba^{2+}$ doping with a formation energy of 2.88 eV per defect. FIG. 2 shows a graph 200 of the calculated Li diffusivities of $S^{2-}$ substituted $Li_{82}Cl_{26}SO_{27}$ obtained by ab initio Molecular Dynamics (MD) simulations with a simulation length over 100 picoseconds. In FIG. 2, vertical axis 210 shows a range of diffusivities, D, and horizontal axis 220 show a range of temperatures. According to the slope of various data points in graph 200, the estimated migration barrier is 160 meV.

Therefore, and without wishing to be bound by theory, the Li$^+$ interstitial may be considered a more favorable charge carrier in the Li$_3$ClO system and may further enhance Li$^+$ transport within the material when it is used as a solid electrolyte.

Examples: Materials Synthesis and Experimental Procedure

Compounds made according to the formula Li$_{3+\delta}$Cl$_{1-\delta}$S$_\delta$O with $\delta$ between or equal to 0 and 0.05 were synthesized by a mechano-chemical method. Stoichiometric amounts of LiCl (99% Sigma Aldrich), Li$_2$S (99.9% Sigma Aldrich), and LiOH (98%, Sigma Aldrich) were measured in an argon-filled glovebox, sealed in a stainless steel jar, and ballmilled by planetary ballmilling (Retch PM200) at 250 rpm for 90 min. The mixture was then placed into an aluminum tube and heated to 400° C. and held for 12 h until the mixture melted completely. While the mixture was being heat treated, the tube was also evacuated by a compressor pump. A liquid nitrogen cold trap was attached to the evacuation line in order to completely remove H$_2$O from the product during reaction. The liquefied specimen was quenched to room temperature with a cooling rate of approximately 200° C. s$^{-1}$. The resulting solid electrolyte compound was then manually ground and stored in a glovebox. The crystal structure of the powder specimen was analyzed by an X-ray diffractometer (Rigaku Miniflex II).

Figure 3:
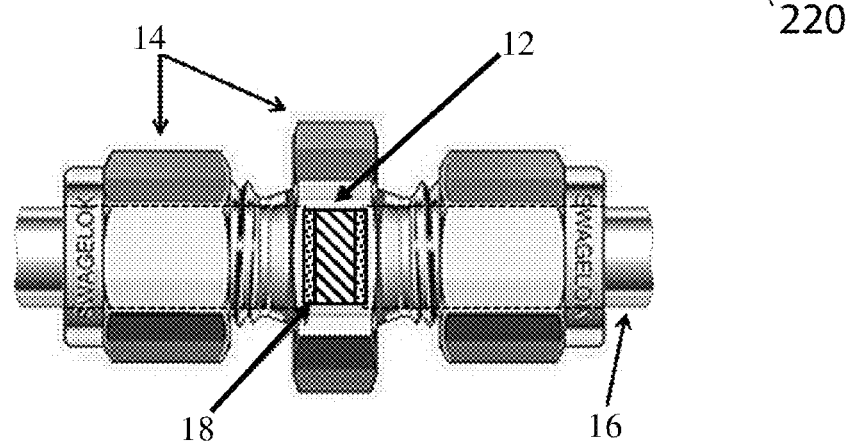
FIG. 3 is a schematic diagram of a setup for impedance spectroscopy measurement.

To test the ionic conductivity, the synthesized Li$_{3+\delta}$Cl$_{1-\delta}$S$_\delta$O (0≤$\delta$≤0.05) powders were pressed into disc-shaped pellets and heated at 250° C. for 2 h for densification. The pellets were 10 mm in diameter and 1 mm to 1.5 mm thick. The pellets 12 were sealed in a PTFE union 14 (Swagelok) and contacted with stainless steel rods 16 for impedance spectroscopy measurement, as shown in FIG. 3. A silver paste 18 was also applied on both sides of the pellets to provide better electrical contact with the stainless steel rods. To obtain impedance spectroscopy, ±20 mV, with respect to the open circuit potential, was applied to the compounds with frequencies ranging from 1 MHz to 0.5 Hz using a Solartron Modulab impedance spectroscope at room temperature.

Examples: X-Ray Diffraction

FIG. 4 shows XRD patterns of Li$_{3+\delta}$Cl$_{1-\delta}$S$_\delta$O (0≤$\delta$≤0.05) specimens fired at 400 ° C. for 12 h under vacuum and quenched to room temperature. The patterns are shown together in a plot 400 whose vertical axis 402 shows intensities of diffracted CuK$\alpha$ radiation in arbitrary units and whose horizontal axis 404 shows a range of diffraction angles. Peaks representing the cubic structure of Li$_3$ClO were clearly observed and are consistent with the predicted diffraction pattern (shown on bottom). However, a small amount of LiOH impurity was detected in the pristine phase. However, the samples were assumed to be almost pure Li$_3$ClO as the amount of the detected impurity was minor. Note that a broad hump at 17.5° 2-theta is due to a polyimide film cover placed on the specimen during testing.

As indicated in the figures, as the amount of S substitution increases with increasing $\delta$ from 0.0025 to 0.005, no impurity phase is detected. However, upon further S substitution as $\delta$ increases from 0.025 to 0.05, peaks for Li$_2$S and LiOH impurities appear. FIG. 5 is a plot 500 that magnifies the XRD patterns around (110) peak in FIG. 4, and shows the systematic peak shifting with respect to increasing S substitution. As is the case with FIG. 4, the vertical axis 502 of plot 500 show intensity in arbitrary units and the horizontal axis 504 of plot 500 show s a range of diffraction angles. However, the shifting does not continue for $\delta$ values going from 0.025 to 0.05 where the Li$_2$S and LiOH signals are observed. Thus, and without wishing to be bound by theory, it is believed that S successfully substitutes the Cl, as intended, for $\delta$ values of 0.0025 and 0.005. However, for $\delta$ values greater than 0.025, further S substitution appears to be beyond the solubility limit of S in the solid electrolyte. Therefore, the substitution limit of S may correspond to a $\delta$ value between or equal to 0.005 and 0.025. However, compounds with $\delta$ values both greater and smaller than this range may also be used.

Examples: Impedance Spectroscopy

Figure 6A:
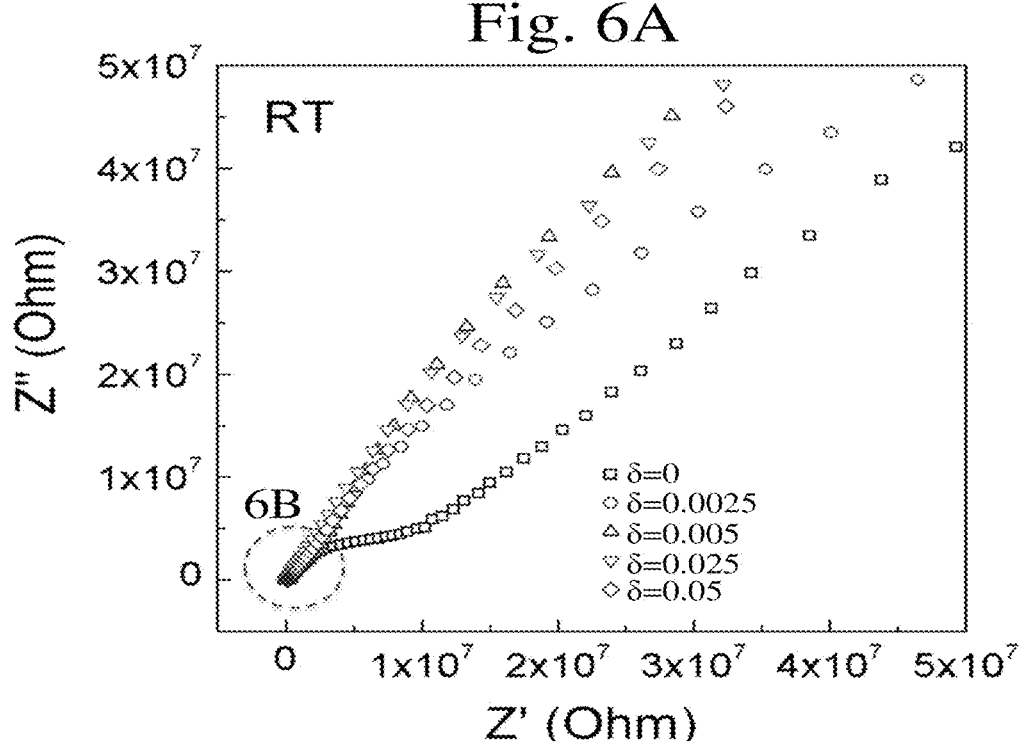
FIG. 6A is a graph of impedance spectroscopy of $Li_{3+\delta}Cl_{1-\delta}S_\delta O$ for different values of $\delta$ between 0 and 0.05.
Figure 6B:
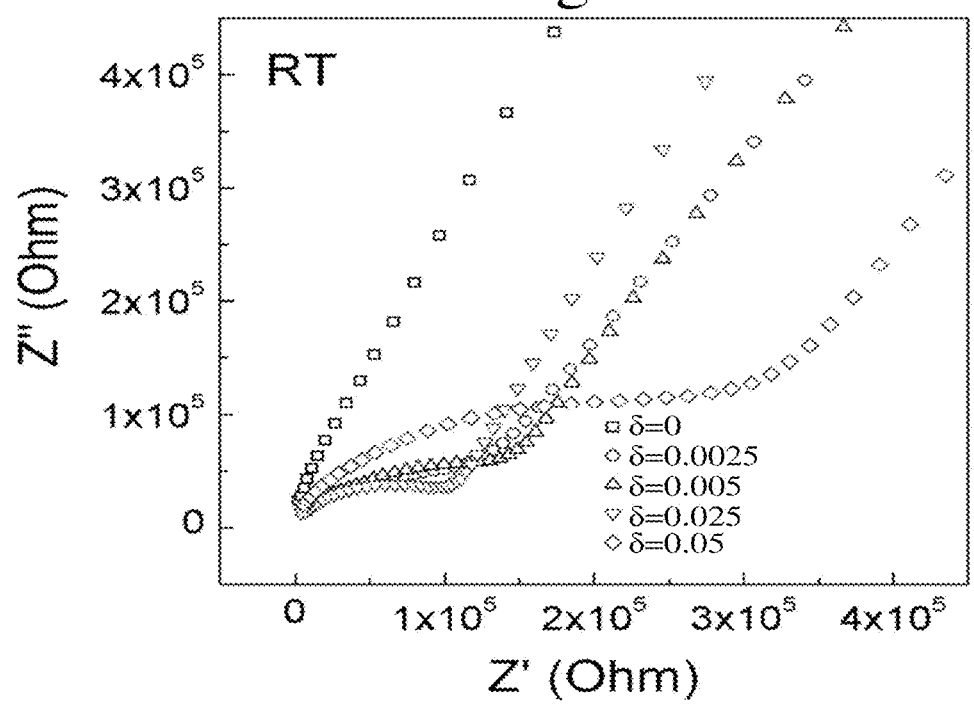
FIG. 6B is an enlarged portion of the impedance spectroscopy graph marked in FIG. 6A by a dashed circle.
Figure 7:
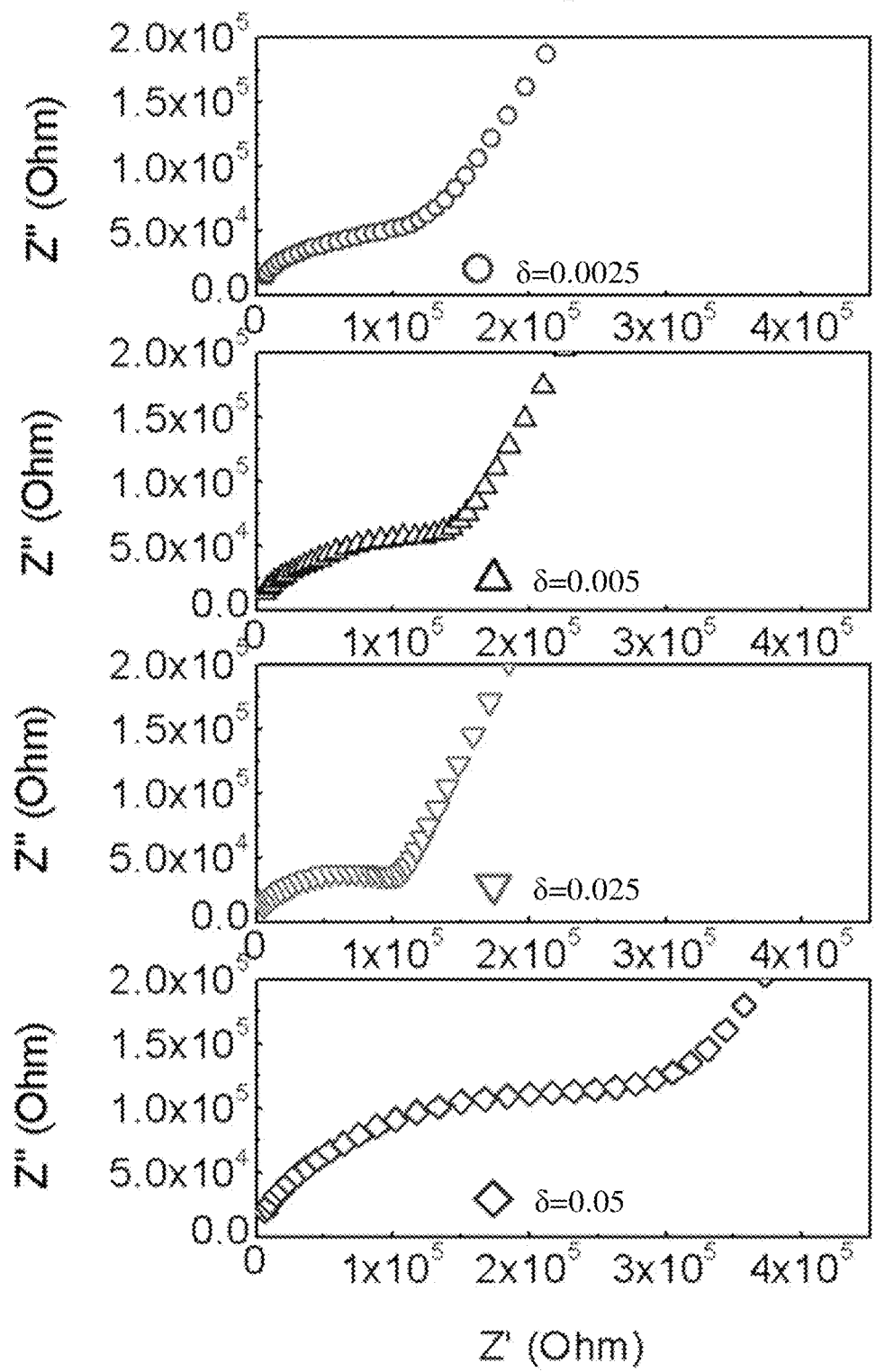
FIG. 7 is a graph of impedance spectroscopy of $Li_{3+\delta}Cl_{1-\delta}S_\delta O$ for different values of $\delta$ between 0 and 0.05.

FIGS. 6A and 6B show the results of impedance spectroscopy of Li$_{3+\delta}$Cl$_{1-\delta}$S$_\delta$O (0≤$\delta$≤0.05) measured at room temperature. The results are plotted having vertical axes depicting $-Z''$ (Ohm) and horizontal axes depicting $Z'$ (ohm). The unsubstituted Li$_3$ClO shows ionic conductivity on the order of 10$^{-4}$ mS cm$^{-1}$ as calculated from FIG. 6A. This value deviates from the previously reported one for unsubstituted Li$_3$ClO which is attributed to testing with pellets that are not fully densified. This value is expected to match the previously measured values for unsubstituted Li$_3$ClO once the pellet formation process is optimized to provide fully densified pellets. In either case, using the current materials and pellet formation process, S$^{2-}$ doping leads to a significant decrease in the impedance compared to the undoped material, as shown in FIG. 6B which is a blown up portion of the graph shown in FIG. 6A. This reduced impedance in the S$^{2-}$ doped materials implies that the Li interstitial functions efficiently as a charge carrier for superionic conductivity. The values obtained for the impedance of the materials at room temperature are on the order of about 10$^{-1}$ mS cm$^{-1}$ to 10$^{-2}$ mS cm$^{-1}$ as calculated using the results presented in FIG. 7, where the values are plotted in graphs having vertical axes depicting $Z''$ (Ohm) and horizontal axes depicting $Z'$ (ohm).

Examples: N Doping

Figures 8, 9:
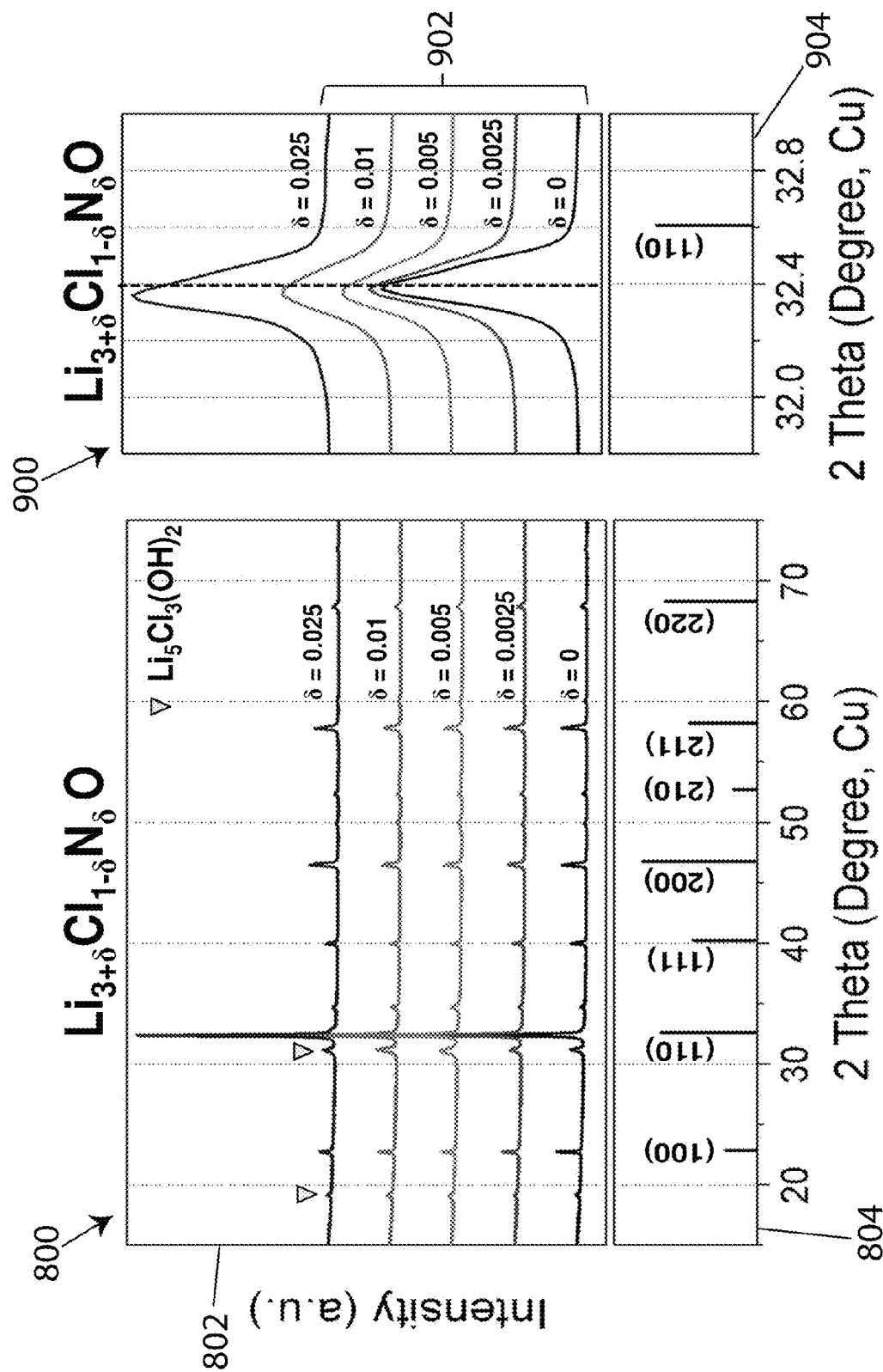
FIG. 8 is a graph of x-ray diffraction (XRD) patterns of $Li_{3+\delta}Cl_{1-\delta}N_\delta O$ for different values of $\delta$ between 0 and 0.025.
FIG. 9 is a graph of magnified XRD patterns of $Li_{3+\delta}Cl_{1-\delta}Ni_\delta O$ for different values of $\delta$ between 0 and 0.025 around the (110) peak.

Using methods similar to those described above, N substitution for Cl in Li$_3$CLO was also attempted so that the overall charge would be compensated by 2 additional interstitial Li ions. X-ray diffraction scans are shown in FIGS. 8-9. In FIG. 8, the patterns are shown together in a plot 800 whose vertical axis 802 show intensities of diffracted CuK$\alpha$ radiation in arbitrary units and whose horizontal axis 804 show a range of diffraction angles. FIG. 9 contains a magnified plot 900 about (110) peak, whose intensity is show in vertical axis 902 and whose angular spread is shown in horizontal axis 904. As the amount of N substitution increases from $\delta$=0.0025 to $\delta$=0.025, no additional peak appears and the 110 peaks shift systematically according to substitution, indicating N substitution. However, due to moisture sensitivity of the compounds, a small amount of Li—Cl-hydroxides were formed as indicated in the figures.

Figure 10:
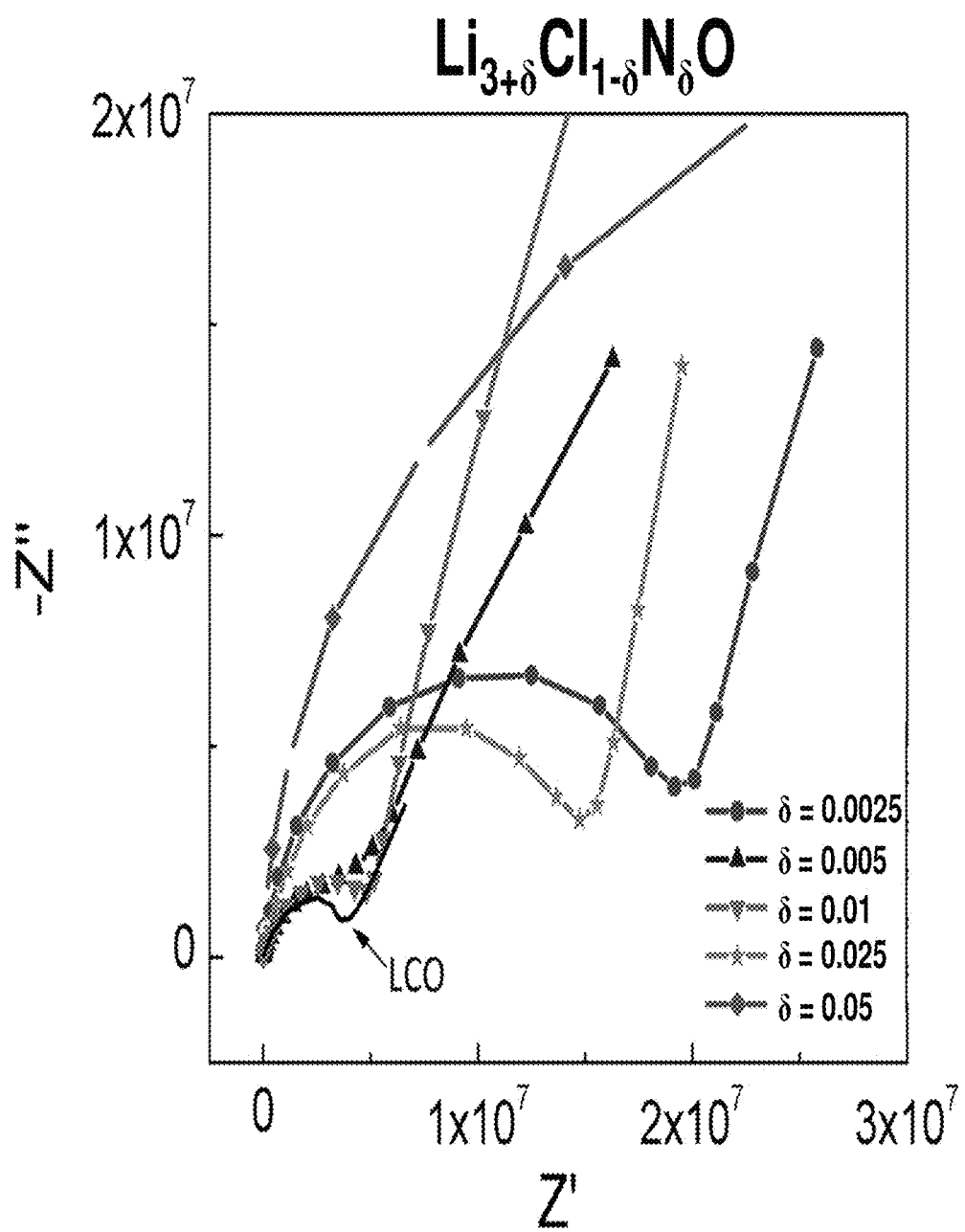
FIG. 10 is a graph of impedance spectroscopy of $Li_{3+\delta}Cl_{1-\delta}N_\delta O$ for different values of $\delta$ between 0 and 0.025.

Impedance spectroscopy was also conducted for the N substituted materials. As shown in FIG. 10, where impedance measurement values are plotted in graphs having vertical axes depicting $-Z''$ (Ohm) and horizontal axes depicting $Z'$ (ohm). The N substituted materials had impedance values ranging from 5×10$^6$ ohms to 6×10$^7$ ohms depending on the amount of N doping. The lowest impedance obtained was for $\delta$=0.005, which is about the same as without doping. Without wishing to be bound by theory, it is somewhat difficult to draw a conclusion regarding the effect of N substitution at this moment due to moisture sensitivity of the material possibly impacting the measured impedance values. For example, hydroxide formation may lead to passivation of the contact surface of the electrolyte, thus, hindering charge transfer across the electrode. Therefore, it expected that improved material performance will be observed with additional modified testing procedures.

Examples: NA Based Materials

The above examples have been directed to Li based materials. However, it is expected that substituted materials based on $Na_3ClO$ will behave in similar manners due to the chemical similarity of Li and Na. Consequently, one of skill in the art reviewing the experimental results described herein would expect a substituted $Na_3ClO$ material to exhibit similar behaviors and properties. This view is supported by many Na-based electroactive materials being motivated by a corresponding Li version of the same chemistry.

Examples: SE Substituted Materials

The above examples have included materials substituted with S and N. Based on the materials that have been successfully substituted with S, it is expected that Se may also be successfully used as a dopant in the substituted materials due to the chemical similarity between S and Se.

Examples: Electrochemical Cell

Figure 11:
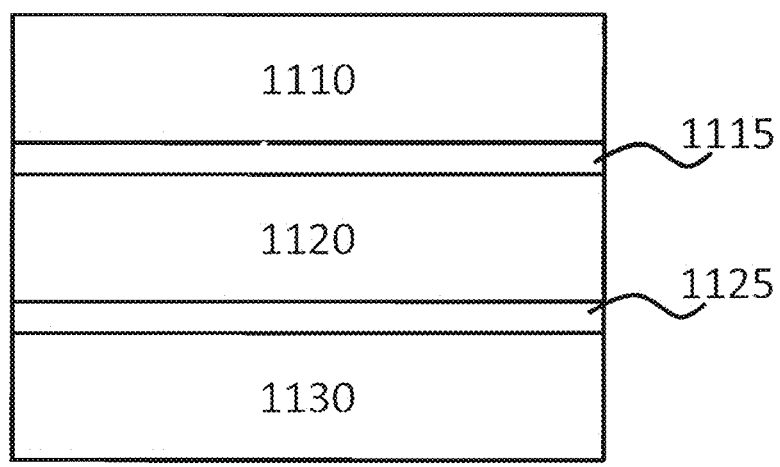
FIG. 11 schematically depicts an exemplary electrochemical cell embodiment.

FIG. 11 schematically depicts an exemplary electrochemical cell 1100, in accordance with an embodiment. The electrochemical cell 700 includes an anode layer 1110 containing an anode material, a cathode layer 1130 containing a cathode material, and an electrolyte layer 1120 between the anode and cathode layers. A first barrier layer 1115 may be provided between the anode layer 1110 and the electrolyte layer 1120. The first barrier layer 1115 can serve to ensure that the anode layer 1110 and the electrolyte layer 1120 do not react in an undesirable chemical manner. Similarly, a second barrier layer 1125 may be provided between the cathode layer 1130 and the electrolyte layer 1120. The second barrier layer 1125 can serve to avoid corrosion occurring between the cathode layer 1130 and the electrolyte layer 1120. It will be appreciated that one or more components of the cell 1100 can be omitted in alternative embodiments. For example, the first and second barrier layers 1115, 1125 can be omitted.

When the anode layer 1110 is metallic lithium, a solid-state Li-conductive material, for example, as described above, may be present in the cathode layer 1130, the electrolyte layer 1120, and/or one or more barrier layers 1115, 1125. The solid-state Li-conductive material may be present within the anode layer 1110 if the anode layer 1110 is formed from a lithium insertion material, e.g., $LiC_6$.

In some embodiments, the cell 700 may, for example, be a rechargeable solid-state cell. One or more cells may be included in the form of a primary or secondary battery, i.e., a single use or rechargeable battery. The battery may take any of a number of shapes, e.g., a coin shape, a laminate shape, a cylindrical shape and a rectangular shape, etc. The cell may also include an anode current collector electrically coupled with the anode layer and a cathode current collector electrically coupled with the cathode layer.

In an example embodiment, the electrolyte layer 1120 contains the solid-state, Li-conductive material. The electrolyte layer 1120 typically includes at least 10% to 100% by volume of the Li-conductive material. The electrolyte layer 1120 may have a thickness of about 0.1 μm to 1000 μm. Optimally, the electrolyte layer thickness 1120 may range from about 0.1 μm to 300 μm. The electrolyte layer 1120 may be less than about 0.1 μm if a means for preventing shorting between the anode and cathode layers 1110, 1130 were provided. Such means may involve processing techniques associated with the electrolyte layer 1120 or with the cell 1100 as a whole to prevent dendritic growth of an electroactive metal like lithium.

The cathode layer 1130 may include a cathode material, the solid electrolyte material, an electrically conductive material and a binder. Cathode active materials suitable for a solid-state lithium battery are typically highly Li-conductive and exhibit a relative high voltage against metallic lithium. In contrast, cathode materials may be ionically nonconductive but electronically conductive.

Microstructurally similar materials used in Li-ion electrochemical cells may be used in an embodiment. For example, $FeS_2$, $MnO_2$, spinel $LiMn_2O_4$, $LiCoO_2$, $LiNiO_2$ may serve as electroactive cathode materials. Examples of electrically conductive materials for use in the cathode include acetylene black and graphitic materials. The cathode active material layer may also contain a binder. Exemplary binders include fluorine-containing polymers such as polytetrafluoroethylene (PTFE) and polyvinylidene fluoride (PVDF). Examples of current collector materials for the cathode layer include aluminum, nickel, iron, titanium and carbon.

The anode layer 1110 includes an anode material and optionally includes the solid electrolyte material, an electrically conductive material, and a binder material. Examples of the anode material include but are not limited to metallic lithium, a metal active material, and a carbon active material. Examples of the metal active material include In, Al, Si, and Sn. Examples of the carbon active material include mesocarbon microbeads (MCMB), high orientation property graphite (HOPG), hard carbon and soft carbon. The electrically conductive material and a binder used for the anode active material layer may be the same as or similar to those contained in the cathode layer. Exemplary anode current collector materials include copper, nickel and carbon.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A solid electrolyte material comprising:
a material of the formula $$A_{3+\delta}Cl_{1-\delta}B_\delta O,$$

wherein
  δ is greater than 0 and less than or equal to 0.05,
  A is Li, and
  B is at least one of S and N.

2. The solid electrolyte material of claim 1, wherein δ is between or equal to 0.0025 and 0.025.

3. The solid electrolyte material of claim 1, wherein B is S.

4. The solid electrolyte material of claim 1, wherein B is N.

5. The solid electrolyte material of claim 1, wherein the material has an antiperovskite crystal structure.

6. The solid electrolyte material of claim 1, wherein a conductivity of the material is between or equal to $10^{-1}$ mS $cm^{-1}$ and $10^{-2}$ mS $cm^{-1}$.

7. A solid electrolyte material comprising:
a crystal structure having the general formula $$A_{3+\delta}Cl_{1-\delta}B_\delta O,$$

wherein
  δ is greater than 0 and less than or equal to 0.05,
  A is Li, and
  B is at least one of S and N; and interstitial lithium ions and/or interstitial sodium ions in the crystal structure.

8. The solid electrolyte material of claim 7, wherein a concentration of the interstitial lithium and/or interstitial sodium ions in the crystal structure is between or equal to 0.02 atomic percent and 1 atomic percent.

9. The solid electrolyte material of claim 7, wherein B includes S.

10. The solid electrolyte material of claim 7, wherein B includes N.

11. The solid electrolyte material of claim 7, wherein the crystal structure is an antiperovskite crystal structure.

12. The solid electrolyte material of claim 7, wherein a conductivity of the material is between or equal to $10^{-1}$ mS cm$^{-1}$ and $10^{-2}$ mS cm$^{-1}$.

13. An electrochemical device comprising:
a first electrode;
a second electrode; and
a solid electrolyte material of the formula $A_{3+\delta}Cl_{1-\delta}B_\delta O$ disposed between the first and second electrodes,
wherein
$\delta$ is greater than 0 and less than or equal to 0.05,
A is Li, and
B is at least one of S and N.

14. The electrochemical device of claim 13, wherein $\delta$ is between or equal to 0.0025 and 0.025.

15. The electrochemical device of claim 13, wherein the solid electrolyte material has an antiperovskite crystal structure.

16. An electrochemical device comprising:
a first electrode;
a second electrode; and
a solid electrolyte material disposed between the first and second electrodes,
wherein the solid electrolyte material includes a crystal structure having the general formula $A_{3+\delta}Cl_{1-\delta}B_\delta O$, wherein
$\delta$ is greater than 0 and less than or equal to 0.05,
A is Li, and
B is at least one of S and N; and
interstitial lithium ions and/or interstitial sodium ions in the crystal structure.

17. The electrochemical device of claim 16, wherein a concentration of the lithium and/or sodium ions in the crystal structure is between or equal to 0.02 atomic percent and 1 atomic percent.

18. The electrochemical device of claim 16, wherein the crystal structure is an antiperovskite crystal structure.

19. The solid electrolyte material of claim 1, wherein $\delta$ is between or equal to 0.001 and 0.05.

20. The solid electrolyte material of claim 13, wherein $\delta$ is between or equal to 0.001 and 0.05.

* * * * *